United States Patent
Krishnan et al.

(10) Patent No.: US 10,719,424 B1
(45) Date of Patent: Jul. 21, 2020

(54) COMPOSITIONAL STRING ANALYSIS

(71) Applicant: Oracle International Corporation, Redwood Shores, CA (US)

(72) Inventors: Padmanabhan Krishnan, Brisbane (AU); Raghavendra Kagalavadi Ramesh, Redwood Shores, CA (US); Yang Zhao, Brisbane (AU)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 16/356,652

(22) Filed: Mar. 18, 2019

(51) Int. Cl.
   *G06F 11/36* (2006.01)
   *G06F 9/54* (2006.01)

(52) U.S. Cl.
   CPC ............ *G06F 11/3612* (2013.01); *G06F 9/54* (2013.01)

(58) Field of Classification Search
   None
   See application file for complete search history.

(56) References Cited

U.S. PATENT DOCUMENTS

| | | | |
|---|---|---|---|
| 7,617,489 B2 * | 11/2009 | Peyton ................. | G06F 21/577 717/133 |
| 2012/0304158 A1 * | 11/2012 | Li ....................... | G06F 11/3604 717/132 |
| 2014/0090068 A1 * | 3/2014 | Guarnieri .............. | G06F 21/577 726/25 |
| 2016/0224793 A1 * | 8/2016 | Lu ........................ | G06F 21/577 |
| 2017/0315903 A1 * | 11/2017 | David .................. | G06F 11/3668 |
| 2019/0121979 A1 * | 4/2019 | Chari .................... | G06F 21/566 |

OTHER PUBLICATIONS

Aske Simon Christensen et al., "Precise Analysis of String Expressions"; In Proceedings of the 10th International Conference on Static Analysis; San Diego, CA, USA; pp. 1-18; Jun. 11-13, 2003 (18 pages).

Giulia Costantini et al., "Static Analysis of String Values"; In ICFEM, LNCS book series, vol. 6991; pp. 505-521; Oct. 2011 (17 pages).

Matthieu Journault et al., "Modular Static Analysis of String Manipulations in C Programs"; In 25th International Symposium, SAS 2018; Freiburg, Germany, Aug. 29-31, 2018 (20 pages).

Se-Won Kim et al., "Inferring Grammatical Summaries of String Values"; In Proceedings of the 12th Asian Symposium on Programming Languages and Systems (APLAS); LNCS book series vol. 8858, pp. 372-391; Nov. 2014 (20 pages).

Fang Yu et al., "Automata-based Symbolic String Analysis for Vulnerability Detection"; Formal Methods in Systems Design, vol. 44, Issue 1; pp. 44-70; Feb. 2014 (27 pages).

* cited by examiner

*Primary Examiner* — Philip Wang
(74) *Attorney, Agent, or Firm* — Ferguson Braswell Fraser Kubasta PC (57) ABSTRACT

A method for performing a static analysis may include extracting, from a caller function in code, a context-free inter-procedural rule including a callsite and a return value of a callee function. The callsite may invoke the callee function. The method may further include extracting, from the caller function, a context-sensitive parameter mapping rule that maps an input parameter of the callee function to an invocation value provided by the caller function at the callsite, deriving a derived value for the callsite using the context-free inter-procedural rule and the context-sensitive parameter mapping rule, and identifying a defect in the code by performing the static analysis using the derived value for the callsite.

15 Claims, 7 Drawing Sheets

COMPOSITIONAL STRING ANALYSIS

BACKGROUND

String analysis computes the string values to which a variable may be assigned. String analysis may be used to identify potentially malicious input that can result in a security vulnerability. For example, string analysis may be used to identify hypertext markup language (HTML) content, JavaScript content, or structured query language (SQL) queries generated by a program. String analysis may also be useful in reducing false positive reports due to the failure to consider sanitization of string values. The use of sanitizers (or input validation policies in general) may render a potentially malicious string safe to use. Conventional string analysis techniques model strings as regular expressions, which, if computed precisely, are not computed efficiently.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, one or more embodiments relate to a method for performing a static analysis including extracting, from a caller function in code, a context-free inter-procedural rule including a callsite and a return value of a callee function. The callsite invokes the callee function. The method further includes extracting, from the caller function, a context-sensitive parameter mapping rule that maps an input parameter of the callee function to an invocation value provided by the caller function at the callsite, deriving a derived value for the callsite using the context-free inter-procedural rule and the context-sensitive parameter mapping rule, and identifying a defect in the code by performing the static analysis using the derived value for the callsite.

In general, in one aspect, one or more embodiments relate to a system for performing a static analysis including a memory coupled to a computer processor, a repository configured to store code including a caller function including a callsite that invokes a callee function, a context-free inter-procedural rule including the callsite and a return value of the callee function, and a context-sensitive parameter mapping rule that maps an input parameter of the callee function to an invocation value provided by the caller function at the callsite. The system further includes a code analyzer, executing on the computer processor and using the memory, configured to extract, from the caller function, the context-free inter-procedural rule extract, from the caller function, the context-sensitive parameter mapping rule, derive a derived value for the callsite using the context-free inter-procedural rule and the context-sensitive parameter mapping rule, and identify a defect in the code by performing the static analysis using the derived value for the callsite.

In general, in one aspect, one or more embodiments relate to a non-transitory computer readable medium including instructions that, when executed by a computer processor, perform: extracting, from a caller function in code, a context-free inter-procedural rule including a callsite and a return value of a callee function. The callsite invokes the callee function. The instructions further perform extracting, from the caller function, a context-sensitive parameter mapping rule that maps an input parameter of the callee function to an invocation value provided by the caller function at the callsite, deriving a derived value for the callsite using the context-free inter-procedural rule and the context-sensitive parameter mapping rule, and identifying a defect in the code by performing a static analysis using the derived value for the callsite.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention are directed to deriving values of a function invoked at a callsite. In one or more embodiments, a context-sensitive grammar is extracted from the function. The context-sensitive grammar may include context-free rules and context-sensitive rules. In one or more embodiments, the context-sensitive rules include special symbols corresponding to callsites and return values. The context-sensitive rules may modify a value used in the function based on contextual information pertaining to the callsite. The contextual information may include invocation values provided when the function is invoked. The rules of the context-sensitive grammar may be applied to derive values for the function at the callsite. A context-sensitive grammar may be extracted separately for each function in the code, thus facilitating scalable and incremental analysis.

Figure 1A:
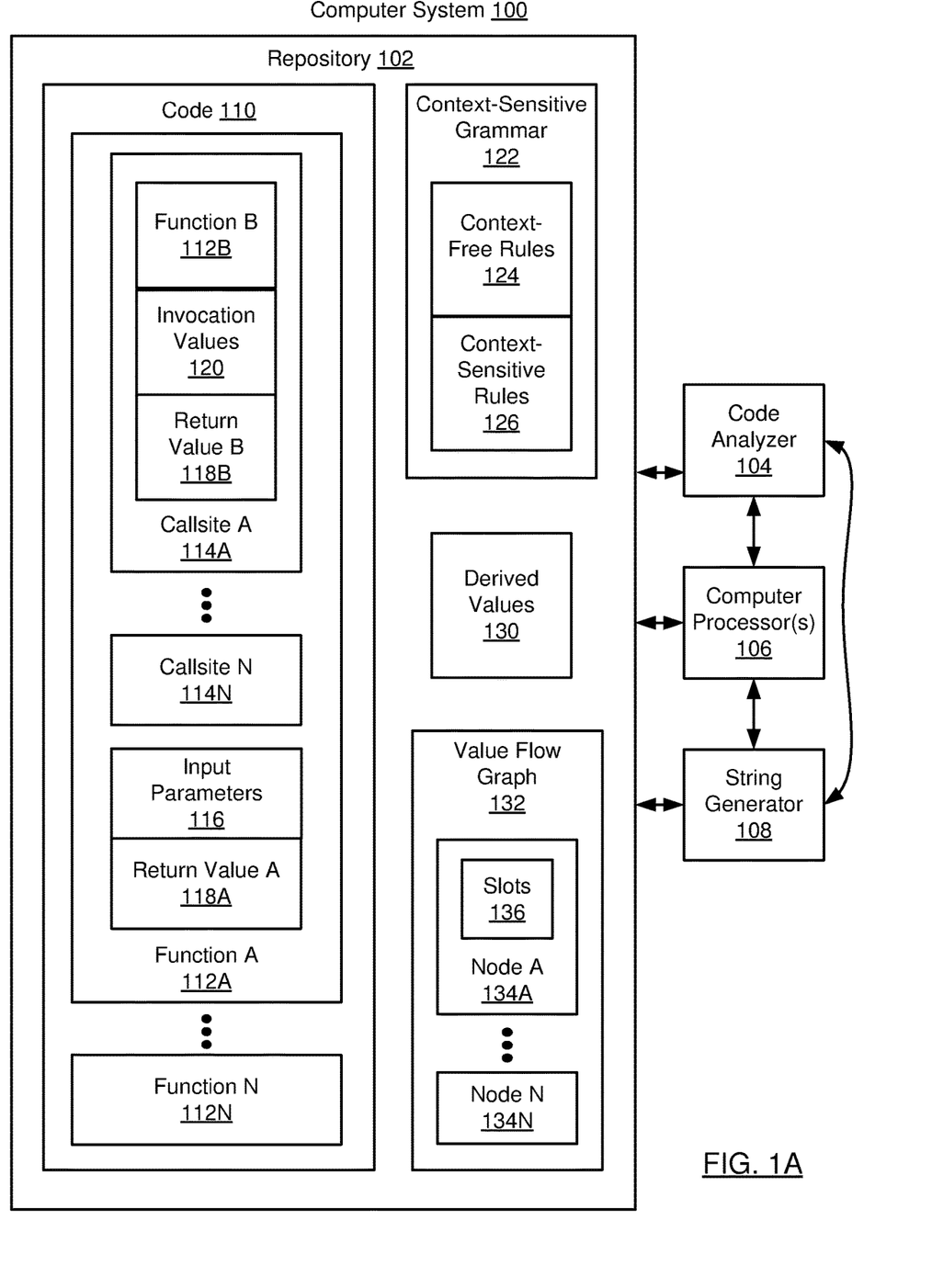
FIG. 1A and FIG. 1B show a system in accordance with one or more embodiments of the invention.

FIG. 1A shows a computer system (100) in accordance with one or more embodiments of the invention. As shown in FIG. 1A, the computer system (100) includes a repository (102), a code analyzer (104), one or more computer processors (106), and a string generator (108). In one or more embodiments, the computer system (100) takes the form of the computing system (500) described with respect to FIG. 5A and the accompanying description below or takes the form of the client device (526) described with respect to FIG. 5B. In one or more embodiments, the computer processor(s) (106) takes the form of the computer processor(s) (502) described with respect to FIG. 5A and the accompanying description below.

In one or more embodiments, the repository (102) may be any type of storage unit and/or device (e.g., a file system, database, collection of tables, or any other storage mechanism) for storing data. Further, the repository (102) may include multiple different storage units and/or devices. The multiple different storage units and/or devices may or may not be of the same type or located at the same physical site.

In one or more embodiments, the repository (102) includes code (110), a context-sensitive grammar (122), derived values (130), and a value flow graph (132). In one or more embodiments, the code (110) is a collection of source code including various software components. That is, the code (110) may be any collection of computer instructions (e.g., statements) written in a human-readable programming language, or intermediate representation (e.g., byte code). The code (110) may be transformed by a compiler into binary machine code. Compiled machine code may be executed by the processor (106) in order to execute the software components generated from the code (110). In one or more embodiments, the code (110) may be any collection of object code (e.g., machine code generated by a compiler) or another form of the code (110).

In one or more embodiments, the code (110) includes functions (112A, 112N). In one or more embodiments, a function (112A) produces a return value (118A) using input parameters (116). Examples of functions (112A, 112N) include methods, procedures, etc. In one or more embodiments, a function (112A) includes callsites (114A, 114N). A callsite (114A) may be a location in the function (112A) where a second function (112B) is called (e.g., invoked). The function (112A) may be referred to as the caller function, and the function (112B) may be referred to as the callee function. In one or more embodiments, the callsite (114A) includes invocation values (120) and a return value (118B). In one or more embodiments, each invocation value (120) and each return value (118A, 118B) is a value (150A), as shown in FIG. 1B.

Figure 1B:
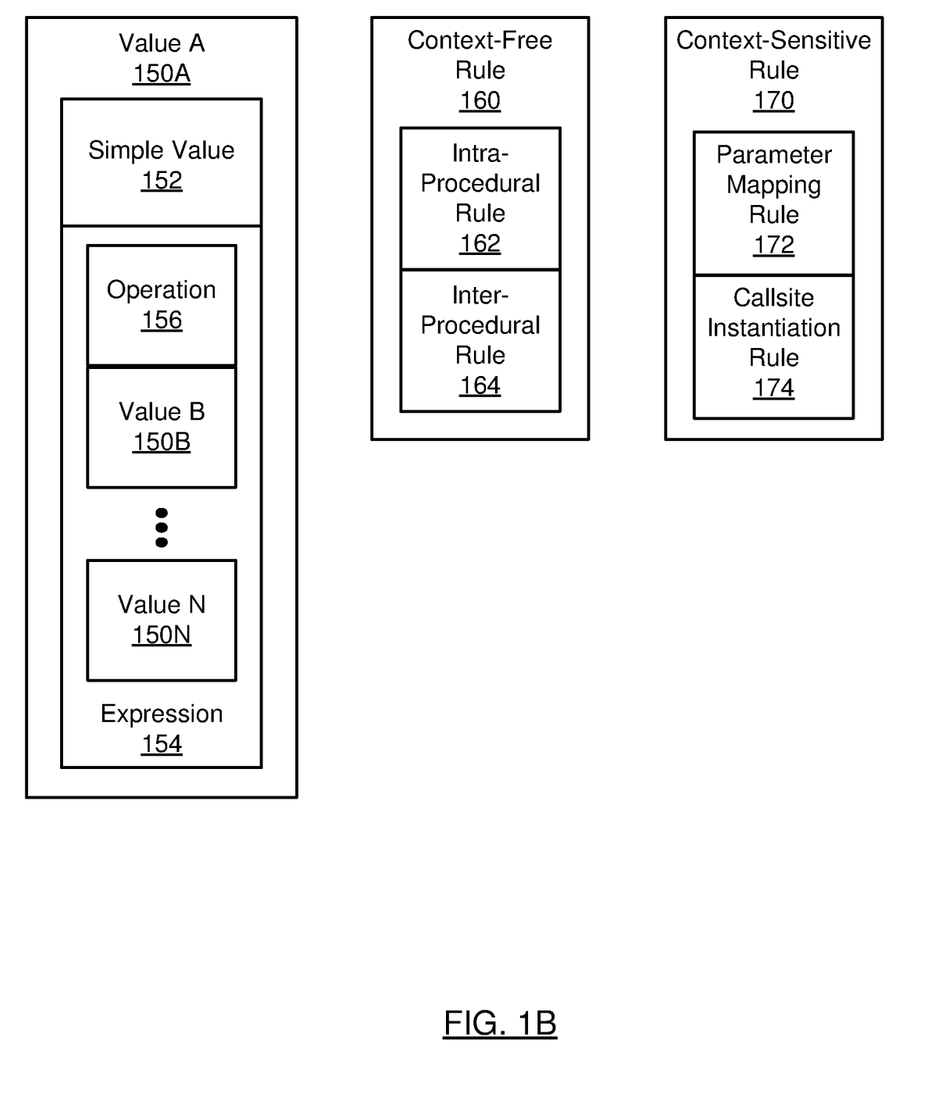

Turning to FIG. 1B, in one or more embodiments, a value (150A) is a simple value (152). For example, the simple value (152) may be a constant or a variable. Alternatively, in one or more embodiments, a value (150A) is an expression (154). For example, the expression (154) may be a regular expression. The expression (154) may include an operation (156) applied to one or more values (150B, 150N). That is, a value may be a recursive structure such that the value may be an expression that includes other values, which in turn may be expressions, etc. The operation (156) may be any operation that accepts one or more inputs and produces one or more outputs. For example, the operation may be a string operation such as concatenate, replace, substring, etc. In addition, the operation may be a sanitization operation, for example, that removes escape characters from a string. Alternatively, the operation may be an arithmetic operation.

Returning to FIG. 1A, the invocation values (120) may be provided by the (caller) function (112A) to the (callee) function (112B) when the function (112A) calls the function (112B) at the callsite (114A). For example, a caller function bar may include the following callsite that invokes a callee function foo: foo(expression1, expression2), where expression1, and expression2 are the invocation values provided by the caller function bar to the callee function foo.

In one or more embodiments, when the (callee) function (112B) is called, the input parameters of the function (112B) are bound to the invocation values (120) provided by the (caller) function (112A). When the (callee) function (112B) completes execution, the return value (118B) may be provided by the (callee) function (112B) to the (caller) function (112A).

In one or more embodiments, the context-sensitive grammar (122) includes rules used to derive values (e.g., patterns of strings) for various program points in the code (110). The context-sensitive grammar (122) may include context-free rules (124) and context-sensitive rules (126). The context-sensitive grammar (122) may include terminals (e.g., constants) that cannot be decomposed further, and nonterminals representing placeholders that may be replaced by applying a rule. In one or more embodiments, nonterminals correspond to variables, return values (118A, 118B) and/or callsites (114A, 114N).

In one or more embodiments, each of the context-free rules (124) includes a single nonterminal in the left-hand side of the rule. Each rule may replace, in a string, the nonterminal in the left-hand side of the rule with a series of one or more nonterminals and/or terminals in the right-hand side of the rule. In a context-free rule (124), the replacement of the nonterminal is context-free in the sense that the replacement of the nonterminal does not depend on the context in which the nonterminal appears in the string. That is, the replacement of the nonterminal does not depend on other terminals and/or nonterminals in proximity to the nonterminal in the string.

Returning to FIG. 1B, in one or more embodiments, a context-free rule (160) is an intra-procedural rule (162). The intra-procedural rule (162) is intra-procedural in the sense that it may be based on a single function (e.g., independent of other functions that may interact with the function). The intra-procedural rule (162) may correspond to an operation. For example, the intra-procedural rule (162) may derive a value for an operation executed by the function (e.g., the (caller) function (112A)). The nonterminal in the left-hand side of the intra-procedural rule (162) may correspond to a variable that is assigned the result of the operation. For example, given the statement x=concat(string1,string2), the corresponding intra-procedural rule may be X→concat (string1,string2).

In one or more embodiments the intra-procedural rule (162) may correspond to a return value of a function (e.g., the (callee) function (112B)), where the nonterminal in the left-hand side of the rule corresponds to the return value. For example, given the statement return(string1)) in a function foo, the corresponding intra-procedural rule may be RETURN$_{foo}$→string1. In one or more embodiments, the context-free grammar (122) includes an intra-procedural rule (162) corresponding to each return point of a function. For example, given a second statement return(string2)) in the function foo, another intra-procedural rule may be RETURN$_{foo}$→string2.

In one or more embodiments, a context-free rule (160) is an inter-procedural rule (164). The inter-procedural rule (164) is inter-procedural in the sense that it may be based on an interaction between functions (e.g., an interaction at a callsite between a caller function and a callee function). The nonterminal on the left-hand side of the inter-procedural rule (164) may correspond to a variable in a function (e.g., the (caller) function (112A)) that is assigned the return value (e.g., the return value (118B)) of another function (e.g., the (callee) function (112B)). The right-hand side of the inter-procedural rule (164) may include the return value and a terminal that represents a callsite (114A). For example, given the statement x=foo( . . . ) at callsite1, the corresponding inter-procedural rule may be X→$\theta_{callsite1}$RETURN$_{foo}$, where the terminal θ (theta) represents a callsite. In one or more embodiments, the inter-procedural rule (164) indicates that the return value is to be contextualized relative to the callsite (114A).

Continuing with FIG. 1B, in one or more embodiments, each context-sensitive rule (170) corresponds to a specific callsite that provides the context for the context-sensitive rule (170). The context-sensitive rule (170) may include a combination of nonterminals and terminals on the left-hand side of the rule. In one or more embodiments, a nonterminal corresponding to the callsite is included in the left-hand side of the context-sensitive rule (170). The replacement of a nonterminal may be context-sensitive in the sense that the replacement of the nonterminal depends on other terminals and/or nonterminals in proximity to the nonterminal in the string.

In one or more embodiments, the context-sensitive rule (170) is a parameter mapping rule (172). The parameter mapping rule (172) may map (e.g., bind) an input parameter of a callee function (112B) to an invocation value (120) provided by a caller function (112A) at a callsite (114A). The left-hand side of the parameter mapping rule (172) may include a terminal for the callsite (114A), and a nonterminal for the input parameter (116). The right-hand side of a parameter mapping rule (172) may include a nonterminal for the invocation value (120). For example, if a function bar has an input parameter x, and a function foo invokes bar with an invocation value y+z at callsite1 (e.g., foo contains the expression bar(y+z)), then a corresponding parameter mapping rule may be $\theta_{callsite1}$X→y+z.

In one or more embodiments, the context-sensitive rule (170) is a callsite instantiation rule (174). The callsite instantiation rule (174) may modify an expression (154) to contextualize the expression (154) for a callsite (114A). In one or more embodiments, the left-hand side of the callsite instantiation rule (174) includes a terminal for the callsite (114A), and a nonterminal for the expression (154). In one or more embodiments, the right-hand side of the callsite instantiation rule (174) includes an operation (156) (e.g., the operation (156) of the expression (154)) applied to values (150B, 150N) (e.g., the values (150B, 150N) of the expression (154)). Each of the values (150B, 150N) in the right-hand side of the callsite instantiation rule (172) may be preceded by a terminal corresponding to the callsite (114A). For example, given an expression concat(string1,string2) at callsite1, a corresponding callsite instantiation rule may be $\theta_{callsite1}$concat(string1,string2)→concat($\theta_{callsite1}$string1, $\theta_{callsite1}$string2).

Returning to FIG. 1A, in one or more embodiments, each derived value (130) is a value (150A), as shown in FIG. 1B. The derived values (130) may be derived using context-free rules (124) and/or context-sensitive rules (128) of the context-sensitive grammar (122). In one or more embodiments, a derived value (130) includes a combination of terminals and nonterminals. For example, a derived value may include one or more nonterminals corresponding to variables used in a function (112A). A derived value (130) may be a value at a callsite (114A). Alternatively, a derived value (130) may be a result of executing an operation.

In one or more embodiments, the value flow graph (132) represents the context-free rules (124) and the context-sensitive rules (126) of the context-sensitive grammar (122).

Figure 4:
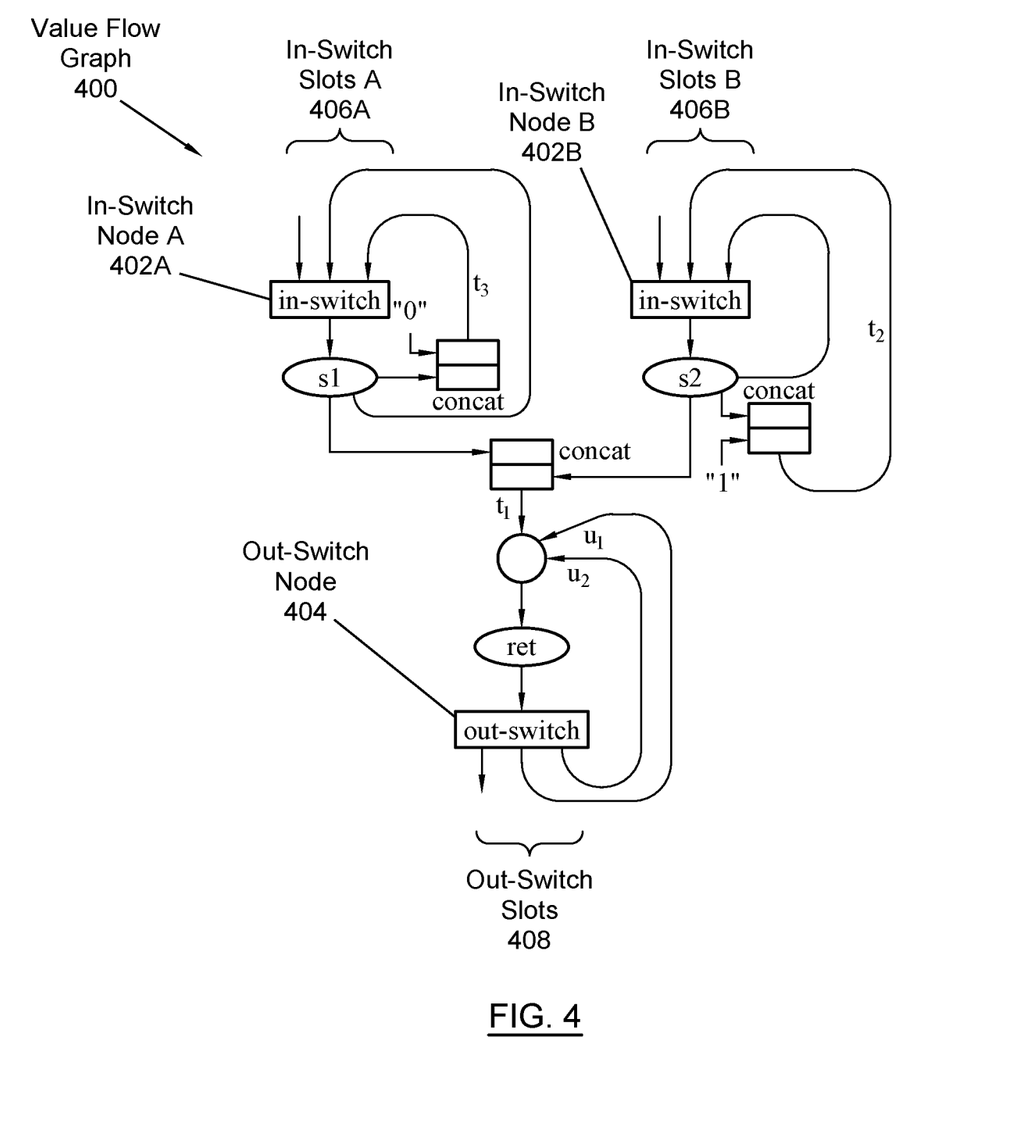

The value flow graph (132) may include nodes (134A, 134N) each corresponding to a nonterminal in the context-sensitive grammar (122). A node (134A) corresponding to an input parameter (116) is called an in-switch node. A node (134A) corresponding to a return value (118A) is called an out-switch node. In one or more embodiments, each node (134A, 134N) includes slots (136) corresponding to callsites (114A, 114N). The slots (136) in the out-switch node may correspond to the slots (136) in the in-switch nodes. The callsites (114A, 114N) of a function (112A) may be arranged in a linear order, and the slots (136) of the in-switch nodes and the out-switch nodes may be arranged in the same linear order. A node (134A) corresponding to an invocation value (120) provided at a callsite (114A) may be connected to a slot (136) of an in-switch node, where the slot (136) corresponds to the callsite (114A). An example of a value flow graph (132) is shown in FIG. 4. The value flow graph (132) may also include additional nodes corresponding to operations, variables, and/or constants used in the context-sensitive grammar (122).

In one or more embodiments, the code analyzer (104) may be implemented in hardware (e.g., circuitry), software, firmware, and/or any combination thereof. The code analyzer (104) may be implemented as part of a compiler. In one or more embodiments, the code analyzer (104) includes functionality to extract a context-sensitive grammar (122) from a function (112A). The code analyzer (104) may include functionality to derive values for callsites (114A, 114N), operations and/or return values (118A, 118B) of a function (112A). The code analyzer (104) may include functionality to identify a defect in the code (110) by performing a static analysis. The code analyzer (104) may include functionality to construct a value flow graph (132) for a function (112A).

In one or more embodiments, the string generator (108) may be implemented in hardware (e.g., circuitry), software, firmware, and/or any combination thereof. In one or more embodiments, the string generator (108) includes functionality to generate string values for callsites (114A, 114N).

In one or more embodiments, the computer processor (106) includes functionality to execute the code (110). In one or more embodiments, the computer processor (106) includes functionality to execute the code analyzer (104) and/or the string generator (108).

While FIG. 1A and FIG. 1B show a configuration of components, other configurations may be used without departing from the scope of the invention. For example, various components may be combined to create a single component. As another example, the functionality performed by a single component may be performed by two or more components.

Figure 2:
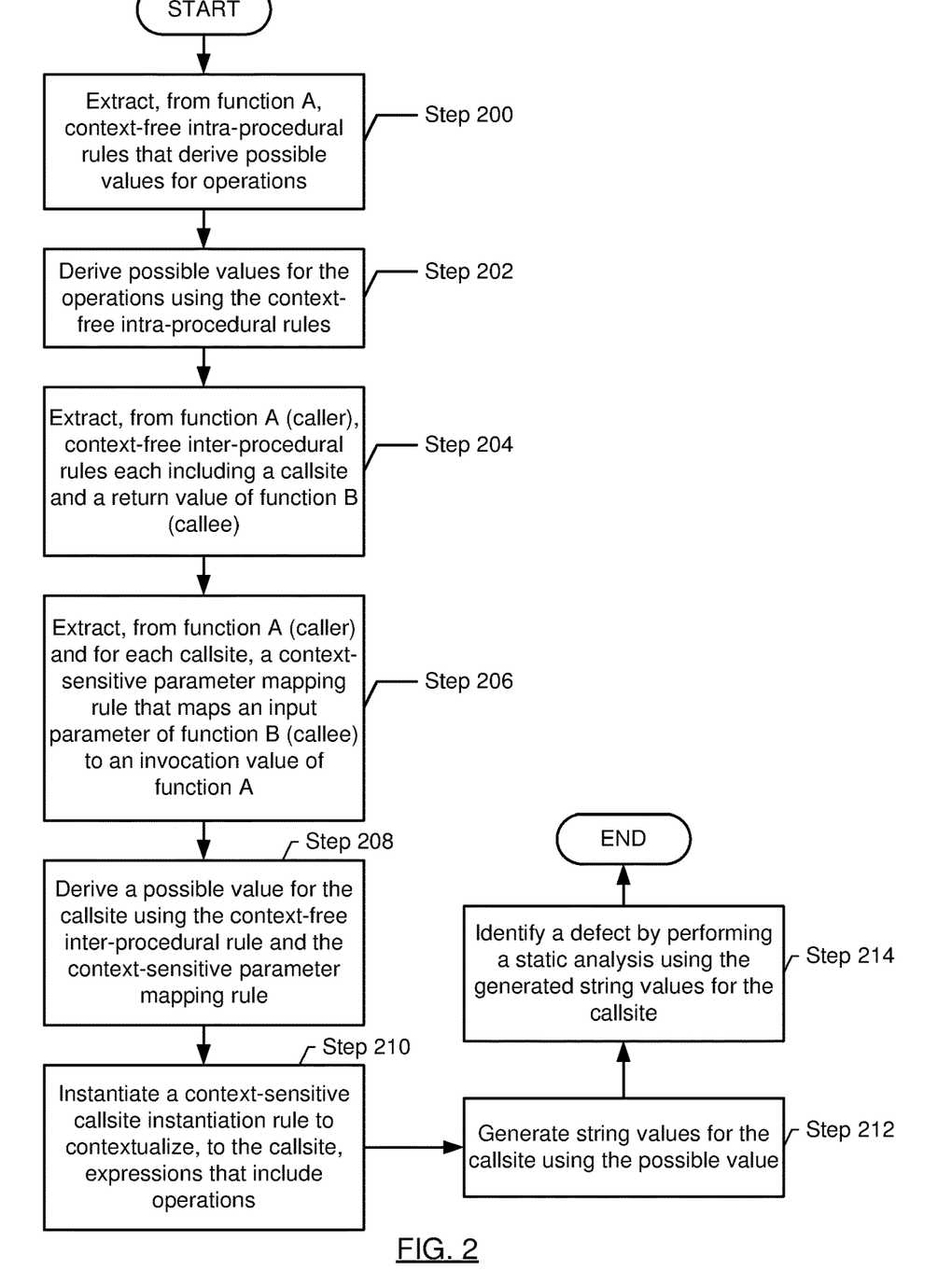
FIG. 2 shows a flowchart in accordance with one or more embodiments of the invention.

FIG. 2 shows a flowchart in accordance with one or more embodiments of the invention. The flowchart depicts a process for string analysis. One or more of the steps in FIG. 2 may be performed by the components (e.g., the code analyzer (104) and/or string generator (108) of the computer system (100)), discussed above in reference to FIG. 1A. In one or more embodiments of the invention, one or more of the steps shown in FIG. 2 may be omitted, repeated, and/or performed in parallel, or in a different order than the order shown in FIG. 2. Accordingly, the scope of the invention should not be considered limited to the specific arrangement of steps shown in FIG. 2.

Initially, in Step 200, context-free intra-procedural rules are extracted from a caller function. In one or more embodiments, the context-free intra-procedural rules derive values for operations (e.g., concatenate, replace, etc.) of the caller function. The context-free intra-procedural rules may also derive return values of the caller function. The code analyzer may examine the statements of the caller function and extract an intra-procedural rule for each operation and each return point encountered.

In Step 202, values for the operations are derived using the context-free intra-procedural rules. The code analyzer may also derive values for the return values of the caller function using the context-free intra-procedural rules. In one or more embodiments, the derived values include a combination of nonterminals and terminals. For example, the nonterminals may correspond to variables used in the operation or return value, and the terminals may correspond to constants used in the operation.

In Step 204, context-free inter-procedural rules are extracted from the caller function. In one or more embodiments, each context-free inter-procedural rule includes a variable, a callsite that invokes a callee function, and a return value of the callee function. The code analyzer may examine the statements of the function and extract an inter-procedural rule for each callsite encountered. The return value may be assigned to the variable. The context-free inter-procedural rule may indicate that the return value is to be contextualized to the callsite. The contextualization to the callsite may be performed by applying one or more context-sensitive rules, as described in Step 208 below.

In Step 206, context-sensitive parameter mapping rules are extracted from the caller function for each callsite. In one or more embodiments, each context-sensitive parameter mapping rule maps (e.g., binds) an input parameter of the callee function to an invocation value provided by the caller function at the callsite. In other words, the context-sensitive parameter mapping rule contextualizes the input parameters of the callee function to the invocation values provided by the caller function at the callsite.

In Step 208, values for the callsite are derived using the context-free inter-procedural rule and the context-sensitive parameter mapping rule(s). In one or more embodiments, the code analyzer applies the context-free inter-procedural rule (extracted in Step 204) to derive a value that includes a terminal representing the callsite and a nonterminal representing the return value of the caller function. Then, the code analyzer may contextualize (e.g., transform) the return value to the callsite by applying context-sensitive parameter mapping rule(s) to the input parameter(s) of the callee function.

As a simple example, an inter-procedural rule may be $X \rightarrow \theta_{callsite1}$string1, where string1, is both a return value of the callee function, and an input parameter of the callee function. The terminal $\theta_{callsite1}$ represents callsite1, and the nonterminal X represents a variable x in the caller function to which the return value is assigned. Continuing this example, the code analyzer may contextualize string1, to callsite1 by applying a context-sensitive parameter mapping rule to the input parameter string1, of the callee function. For example, the parameter mapping rule may be $\theta_{callsite}$1string1$\rightarrow$concat(stringB, stringC), where the expression concat(stringB, stringC) is the invocation value provided by the caller function at callsite1. Thus, applying the parameter mapping rule to the result of applying the inter-procedural rule may be concat(stringB, stringC), which represents a derived value for callsite1.

In one or more embodiments, the code analyzer applies a combination of rules included in the context-sensitive grammar to derive the value for the callsite. For example, the code analyzer may apply intra-procedural rules and callsite instantiation rules, in addition to inter-procedural rules and parameter mapping rules. In one or more embodiments, the code analyzer applies the combination of rules until each nonterminal that represents a return value and each terminal that represents a callsite has been replaced.

In Step 210, a context-sensitive callsite instantiation rule is instantiated to contextualize, to the callsite, expressions that include operations applied to one or more values. For example, during the derivation of values for the callsite in Step 208 above, the code analyzer may instantiate the callsite instantiation rule to contextualize derived expressions that include operations (e.g., concatenation operations, replace operations, etc.). In one or more embodiments, the code analyzer performs the following steps when instantiating the callsite instantiation rule: 1) derive values contextualized to the callsite by applying one or more context-sensitive rules to the one or more values; and 2) construct a new expression that includes the operator applied to the contextualized values. For example, a value that is an input parameter of the callee function may be contextualized to the callsite by applying a parameter mapping rule for the callsite, as described above in Step 206. Alternatively, a value that is an expression may be contextualized to the callsite by recursively instantiating the callsite instantiation rule for the expression. In other words, when the value is an expression, the expression may be contextualized to the callsite by contextualizing the expression's values to the callsite, and then applying the expression's operation to the contextualized values.

Thus, the number of instantiations of the context-sensitive callsite instantiation rule may depend linearly on the number of callsites in the caller function and the number of operations in the caller function.

In Step 212, string values for the first callsite are generated using the derived value. In one or more embodiments, the string generator generates string values that include a combination of terminals and nonterminals. For example, a generated string value may be a regular expression. Alternatively, in one or more embodiments, the generated string values may include only terminals. For example, the string generator may apply the rules of the context-sensitive grammar until the resulting value contains only terminals. The string generator may generate string values that match tokens or keywords used in statements of a programming language (e.g., JavaScript, SQL, HTML, etc.). In one or more embodiments, the string values are generated using a constraint of a static analysis. For example, the constraint may be that each generated string value match a keyword in a set of keywords (e.g., SQL keywords). As another example, the constraint may specify an upper bound on the number of times that the rules of the context-sensitive grammar are applied (e.g., to enforce an upper bound on the length of the generated string values).

In Step 214, a defect is identified by performing a static analysis of the code. The code analyzer may perform the static analysis using the derived value for the callsite. Alternatively, the code analyzer may perform the static analysis using a generated string value (e.g., generated in Step 212 above) for the callsite. In one or more embodiments, the static analysis may further use the derived values for the operations and/or return values derived in Step 202 above.

The defect may correspond to the callsite. For example, the defect may correspond to a potential taint flow at the callsite, where a potentially tainted value flows from an input parameter of a function to a return value of the function. In one or more embodiments, the code analyzer constructs a value flow graph for the function. The defect may correspond to a path in the value flow graph from a slot of an in-switch node in the value flow graph to a corresponding slot of an out-switch node in the value flow graph. In one or more embodiments, the code analyzer identifies the defect by determining that the slot of the out-switch node is reachable from the corresponding slot of the in-switch node.

In one or more embodiments, the process described in FIG. 2 is performed for each function in the code. The process described in FIG. 2 is scalable since the number of context-sensitive rules extracted from each function depends linearly on the number of callsites.

Figure 3A:
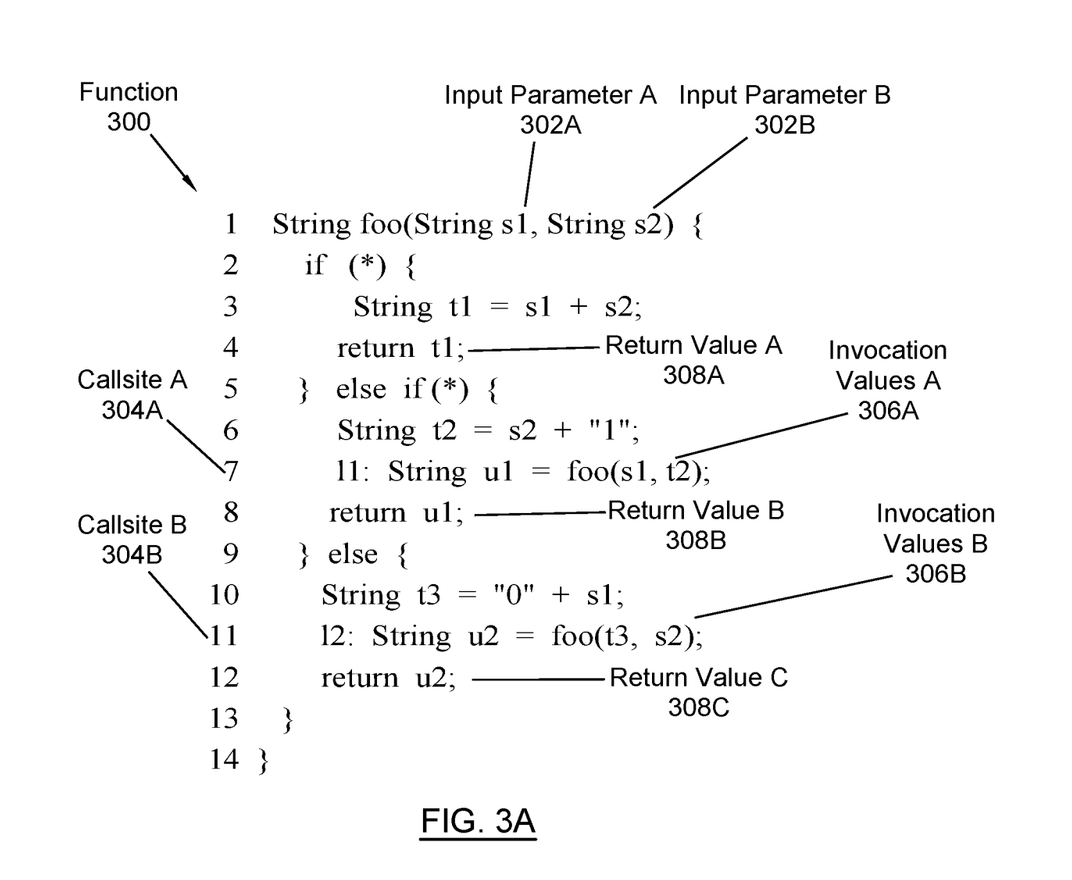
FIG. 3A, FIG. 3B, and FIG. 4 show examples in accordance with one or more embodiments of the invention.
Figure 3B:
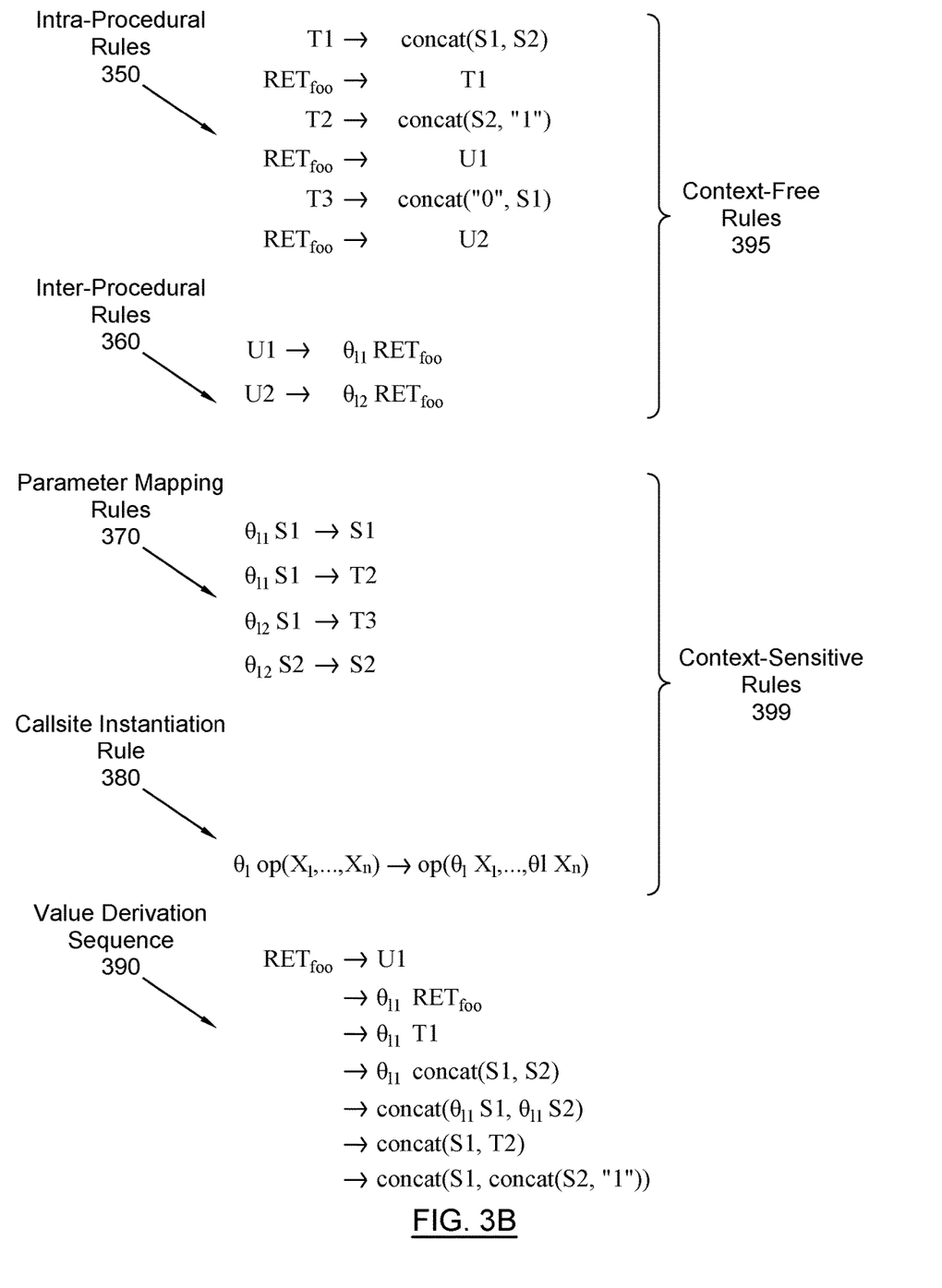

The following example is for explanatory purposes only and not intended to limit the scope of the invention. FIG. 3A, FIG. 3B, and FIG. 4 show implementation examples in accordance with one or more embodiments of the invention. FIG. 3A shows a function (300) ((112A, 112N) in FIG. 1A) that includes input parameters (302A, 302B) ((116) in FIG. 1A), callsites (304A, 304B) ((114A, 114N) in FIG. 1A), invocation values (306A, 306B) ((120) in FIG. 1A), and return values (308A, 308B, 308C) ((118A, 118B) in FIG. 1A). The function (300) is recursively defined such that the function (300) is both the caller function and the callee function at both callsites (304A, 304B). At each callsite (304A, 304B), the input parameters (302A, 302B) are bound to the invocation values (306A, 306B) upon invocation. When the function (300) completes execution, one of the return values (308A, 308B, 308C) is returned, depending on which branch of the if statement is executed. The conditional predicates of the if statement in the function (300) are ignored since the static analysis to be performed on the function (300) is path-insensitive.

The code analyzer ((104) in FIG. 1A), while performing a static analysis of the function (300), extracts context-free rules (395) ((124) in FIG. 1A and (160) in FIG. 1B)) and context-sensitive rules (399) ((126) in FIG. 1A and (170) in FIG. 1B)), as illustrated in FIG. 3B. The code analyzer initially extracts context-free intra-procedural rules (350) by examining the operations and return values (308A, 308B, 308C) of the function (300). Each of the intra-procedural rules (350) derives a value for an operation or return value (308A, 308B, 308C) of the function (300). The first intra-procedural rule T1→concat(S1,S2) corresponds to the statement at line 3 of the function (300), where the variable t1 is assigned the value of the concatenation operation applied to the input parameters (302A, 302B). The second intra-procedural rule $RET_{foo}$→T1 corresponds to the statement at line 4 of the function (300), where return value A (308A) is the variable t1. The third intra-procedural rule T2→concat(S2, "1") corresponds to the statement at line 6 of the function (300), where the variable t2 is assigned the value of the concatenation operation applied to the input parameter s2 and the character "1". The fourth intra-procedural rule $RET_{foo}$→U1 corresponds to the statement at line 8 of the function (300), where return value B (308B) is the variable u1. The fifth intra-procedural rule T3→concat("0",S1) corresponds to the statement at line 10 of the function (300), where the variable t3 is assigned the value of the concatenation operation applied to the character "0" and the input parameter s1. The sixth intra-procedural rule $RET_{foo}$→U2 corresponds to the statement at line 12 of the function (300), where return value C (308C) is the variable u2.

Next, the code analyzer extracts context-free inter-procedural rules (360) by examining the callsites (304A, 304B) of the function (300). In this case, since the function (300) is defined recursively, both the caller function and the callee function are the same function (300). Each of the inter-procedural rules (360) contextualizes a return value of the (callee) function (300) to a callsite (304A, 304B). The first inter-procedural rule U1→$\theta_{11}RET_{foo}$ corresponds to callsite A (304A), where the variable u1 is assigned the return value of the callee function. The terminal $\theta_{11}$ corresponds to callsite A (304A). The second inter-procedural rule U2→$\theta_{12}RET_{foo}$ corresponds to callsite B (304B), where the variable u2 is assigned the return value of the callee function. The terminal $\theta_{12}$ corresponds to callsite B (304B).

Next, the code analyzer extracts context-sensitive parameter mapping rules (370) by examining the callsites (304A, 304B) of the function (300). Each of the parameter mapping rules (370) maps the input parameters (302A, 302B) of the (callee) function (300) to the invocation values (306A, 306B) of the (caller) function (300) provided at the respective callsite (304A, 304B). The first parameter mapping rule $\theta_{11}S1$→S1 maps input parameter A (302A) to the variable s1, which is the first of the invocation values (306A) provided at callsite A (304A). The second parameter mapping rule $\theta_{11}S2$→T2 maps input parameter B (302B) to the variable t2, which is the second of the invocation values (306A) provided at callsite A (304A). The third parameter mapping rule $\theta_{12}S1$→T3 maps input parameter A (302A) to the variable t3, which is the first of the invocation values (306B) provided at callsite B (304B). The fourth parameter mapping rule $\theta_{12}S2$→S2 maps input parameter B (302B) to the variable s2, which is the second of the invocation values (306B) provided at callsite B (304B).

While performing the static analysis, the code analyzer derives values at the callsites (304A, 304B) of the function (300) by applying the context-free rules (395) and the context-sensitive rules (399). As described below, during the derivation process, the code analyzer instantiates the context-sensitive callsite instantiation rule (380) in order to replace a terminal that represents a callsite when the terminal is adjacent to an expression ((154) in FIG. 1B) that includes an operation applied to one or more values.

The value derivation sequence (390) illustrates the derivation of a value at callsite A (304A). The code analyzer derives the first step of the value derivation sequence (390) by applying the fourth intra-procedural rule (350) $RET_{foo}$→U1, which indicates that the return value is the variable u1. The code analyzer then derives the second step of the value derivation sequence (390) by applying the first inter-procedural rule (360) U1→$\theta_{11}RET_{foo}$, which contextualizes the return value to callsite A (304A), as indicated by the terminal $\theta_{11}$, which corresponds to callsite A (304A). The code analyzer then derives the third step of the value derivation sequence (390) by applying the second intra-procedural rule (350) $RET_{foo}$→T1, which indicates that the return value is the variable t1. That is, the value derivation sequence (390) explores the scenario where the first clause in the if statement of the function (300) is executed, thus ending the sequence of recursive calls to the function (300).

The code analyzer then derives the fourth step of the value derivation sequence (390) by applying the first intra-procedural rule (350) T1→concat(S1,S2), which indicates that the variable t1 is assigned the value of the concatenation operation applied to the input parameters s1 and s2 of the (callee) function (300). The code analyzer then derives the fifth step of the value derivation sequence (390) by instantiating the context-sensitive callsite instantiation rule (380) on the expression $\theta_{11}$concat(S1,S2) relative to callsite A (304A), as indicated by the terminal $\theta_{11}$, resulting in the new expression concat($\theta_{11}$S1, $\theta_{11}$S2). The new expression includes the concatenation operator applied to the contextualized values (i.e., operands) of the concatenation operator, where the values are contextualized to callsite A (304A).

The code analyzer then derives the sixth step of the value derivation sequence (390) to perform the contextualization of the values by applying the context-sensitive parameter mapping rules (370), which map the input parameters s1 and s2 to the corresponding invocation values s1 and t2 provided at callsite A (304A). The code analyzer then derives the seventh and final step of the value derivation sequence (390) by applying the third intra-procedural rule (350) T2→concat(S2,"1"), which indicates that the variable t2 is assigned the value of the concatenation operation applied to the input parameter s2 of the (callee) function (300) and the character "1". Thus, a derived value at callsite A (304A) is concat(S1, concat(S2,"1")).

The string generator ((108) in FIG. 1A) then generates strings for callsite A (304A) based on the derived value. The code analyzer uses the generated strings for callsite A (304A) when performing the static analysis.

FIG. 4 illustrates a value flow graph (400) ((132) in FIG. 1A) constructed using the context-free rules (395) and the context-sensitive rules (399) for the function (300). The code analyzer may apply various graph algorithms (e.g., reachability algorithms) to the value flow graph (400) while performing the static analysis.

The value flow graph (400) includes in-switch nodes (402A, 402B) corresponding to the input parameters (302A, 302B) of the function (300). The value flow graph (400) also includes an out-switch node (404) corresponding to the return values (308A, 308B, 308C) of the function (300). The value flow graph (400) further includes additional nodes corresponding to operations (e.g., the concatenation operations), variables, and constants used in the function (300).

The edges in the value flow graph (400) trace the flow of values derived by the code analyzer due to instantiating the callsite instantiation rule (380). The code analyzer traverses the edges between nodes as the context-free rules (395) and the context-sensitive rules (399) are applied during the static analysis. The in-switch slots (406A, 406B) correspond to the callsites (304A, 304B) of the function (300). The in-switch slots (406A, 406B) separate the contextualization of values by callsite (304A, 304B) for the in-switch nodes (402A, 402B) (i.e., input parameters (302A, 302B) of the function (300)). Similarly, out-switch slots (408) separate the contextualization of values by callsite (304A, 304B) for the out-switch node (404) (i.e., return values (308A, 308B, 308C) of the function (300)).

Figure 5A:
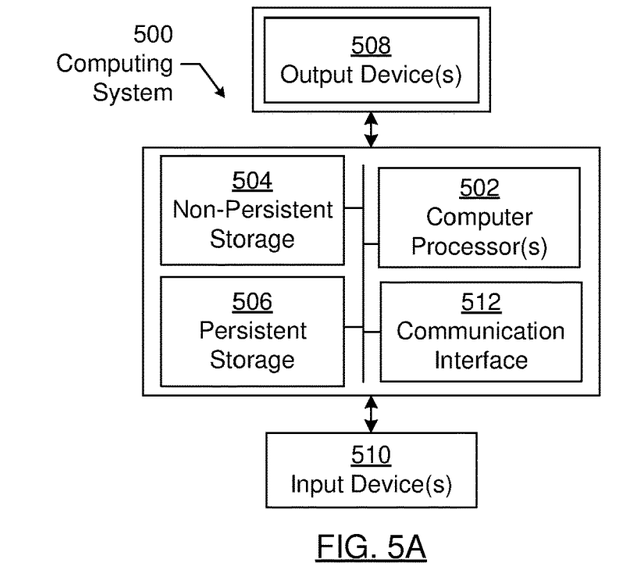
FIG. 5A and FIG. 5B show computing systems in accordance with one or more embodiments of the invention.

Embodiments disclosed herein may be implemented on a computing system. Any combination of mobile, desktop, server, router, switch, embedded device, or other types of hardware may be used. For example, as shown in FIG. 5A, the computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), and numerous other elements and functionalities.

The computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device.

The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments disclosed herein may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments disclosed herein.

Figure 5B:
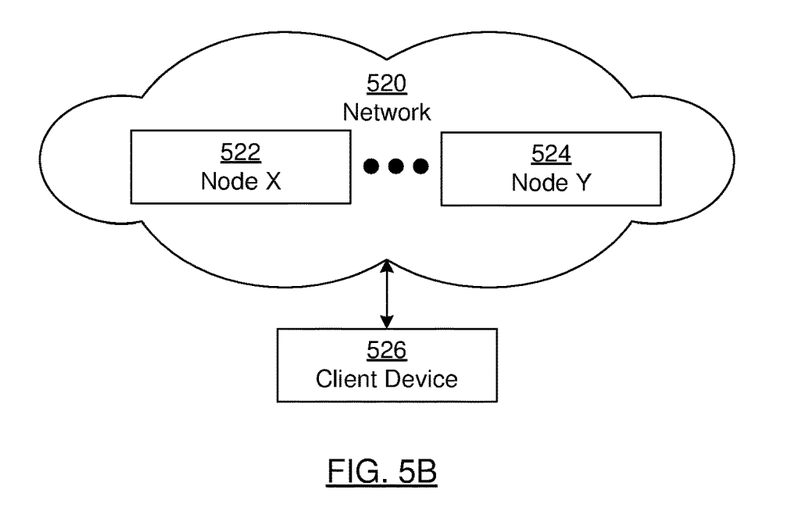

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments disclosed herein may be implemented on a node of a distributed system that is connected to other nodes. By way of another example, embodiments disclosed herein may be implemented on a distributed computing system having multiple nodes, where each portion disclosed herein may be located on a different node within the distributed computing system. Further, one or more elements of the aforementioned computing system (500) may be located at a remote location and connected to the other elements over a network.

Although not shown in FIG. 5B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system shown in FIG. 5A. Further, the client device (526) may include and/or perform all or a portion of one or more embodiments disclosed herein.

The computing system or group of computing systems described in FIGS. 5A and 5B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

The computing system in FIG. 5A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The above description of functions presents only a few examples of functions performed by the computing system of FIG. 5A and the nodes and/or client device in FIG. 5B. Other functions may be performed using one or more embodiments disclosed herein.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for performing a static analysis, comprising:
    extracting, from a caller function in code and for a set of callsites, a set of context-free inter-procedural rules comprising a set of return values of a callee function, wherein each of the set of callsites invokes the callee function;
    extracting, from the caller function and for the set of callsites, a set of context-sensitive parameter mapping rules that map a set of input parameters of the callee function to a set of invocation values provided by the caller function;
    adding, to a value flow graph, a set of nodes corresponding to the set of input parameters and the set of return values;
    adding, to each of the set of nodes, a set of slots corresponding to the set of callsites;
    deriving a first derived value for a first callsite of the set of callsites using the value flow graph; and
    identifying, by performing the static analysis using the first derived value for the first callsite, a first defect in the code by determining that a first slot corresponding to a first node of the set of nodes is reachable from a second slot corresponding to a second node of the set of nodes, wherein the first slot and the second slot correspond to a same callsite.

2. The method of claim 1, further comprising:
    deriving a second derived value for a second callsite of the set of callsites using the value flow graph; and identifying a second defect in the code by performing the static analysis using the second derived value for the second callsite.

3. The method of claim 1, further comprising:
deriving an expression comprising an operation applied to one or more values; and
instantiating a context-sensitive callsite instantiation rule to contextualize the expression for the first callsite by:
deriving contextualized values by applying, using the first callsite, one or more context-sensitive rules to the one or more values; and
constructing a new expression comprising the operator applied to the contextualized values.

4. The method of claim 1, further comprising:
extracting, from the caller function, an intra-procedural context-free rule that derives a derived value for an operation; and
deriving the derived value for the operation using the intra-procedural context-free rule,
wherein performing the static analysis further uses the derived value for the operation.

5. The method of claim 1, further comprising:
generating string values for the first callsite using the first derived value and a constraint of the static analysis,
wherein performing the static analysis further uses the generated string values for the first callsite.

6. A system for performing a static analysis, comprising:
a memory coupled to a computer processor;
a repository configured to store:
code comprising a caller function and a set of callsites that each invoke a callee function,
a set of context-free inter-procedural rules comprising a set of return values of the callee function,
a set of context-sensitive parameter mapping rules that map a set of input parameters of the callee function to a set of invocation values provided by the caller function, and
a value flow graph comprising a set of nodes corresponding to the set of input parameters and the set of return values, wherein each of the set of nodes comprises a set of slots corresponding to the set of callsites, and
a code analyzer, executing on the computer processor and using the memory, configured to:
extract, from the caller function, the set of context-free inter-procedural rules,
extract, from the caller function, the set of context-sensitive parameter mapping rules,
derive a first derived value for a first callsite of the set of callsites using the value flow graph, and
identify, by performing the static analysis using the first derived value for the first callsite, a first defect in the code by determining that a first slot corresponding to a first node of the set of nodes is reachable from a second slot corresponding to a second node of the set of nodes, wherein the first slot and the second slot correspond to a same callsite.

7. The system of claim 6, wherein the code analyzer is further configured to:
derive a second derived value for a second callsite of the set of callsites using the value flow graph, and
identify a second defect in the code by performing the static analysis using the second derived value for the second callsite.

8. The system of claim 6, wherein the code analyzer is further configured to:
derive an expression comprising an operation applied to one or more values; and
instantiate a context-sensitive callsite instantiation rule to contextualize the expression for the first callsite by:
deriving contextualized values by applying, using the first callsite, one or more context-sensitive rules to the one or more values, and
constructing a new expression comprising the operator applied to the contextualized values.

9. The system of claim 6, wherein the code analyzer is further configured to:
extract, from the caller function, an intra-procedural context-free rule that derives a derived value for an operation, and
derive the derived value for the operation using the intra-procedural context-free rule,
wherein performing the static analysis further uses the derived value for the operation.

10. The system of claim 6, further comprising a string generator executing on the computer processor and using the memory, configured to generate string values for the first callsite using the first derived value and a constraint of the static analysis, wherein performing the static analysis further uses the generated string values for the first callsite.

11. A non-transitory computer readable medium comprising instructions that, when executed by a computer processor, perform:
extracting, from a caller function in code and for a set of callsites, a set of context-free inter-procedural rules comprising a set of return values of a callee function, wherein each of the set of callsites invokes the callee function;
extracting, from the caller function and for the set of callsites, a set of context-sensitive parameter mapping rules that map a set of input parameters of the callee function to a set of invocation values provided by the caller function;
adding, to a value flow graph, a set of nodes corresponding to the set of input parameters and the set of return values;
adding, to each of the set of nodes, a set of slots corresponding to the set of callsites;
deriving a first derived value for a first callsite of the set of callsites using the value flow graph; and
identifying, by performing a static analysis using the first derived value for the first callsite, a first defect in the code by determining that a first slot corresponding to a first node of the set of nodes is reachable from a second slot corresponding to a second node of the set of nodes, wherein the first slot and the second slot correspond to a same.

12. The non-transitory computer readable medium of claim 11, further comprising instructions that perform:
deriving a second derived value for a second callsite of the set of callsites using the value flow graph; and
identifying a second defect in the code by performing the static analysis using the second derived value for the second callsite.

13. The non-transitory computer readable medium of claim 11, further comprising instructions that perform:
deriving an expression comprising an operation applied to one or more values; and
instantiating a context-sensitive callsite instantiation rule to contextualize the expression for the first callsite by:

deriving contextualized values by applying, using the first callsite, one or more context-sensitive rules to the one or more values; and constructing a new expression comprising the operator applied to the contextualized values.

14. The non-transitory computer readable medium of claim 11, further comprising instructions that perform:

extracting, from the caller function, an intra-procedural context-free rule that derives a derived value for an operation; and deriving the derived value for the operation using the intra-procedural context-free rule, wherein performing the static analysis further uses the derived value for the operation.

15. The non-transitory computer readable medium of claim 11, further comprising instructions that perform:

generating string values for the first callsite using the first derived value and a constraint of the static analysis, wherein performing the static analysis further uses the generated string values for the first callsite.

* * * * *

UNITED STATES PATENT AND TRADEMARK OFFICE
CERTIFICATE OF CORRECTION

PATENT NO. : 10,719,424 B1
APPLICATION NO. : 16/356652
DATED : July 21, 2020
INVENTOR(S) : Padmanabhan Krishnan et al.

Page 1 of 1

It is certified that error appears in the above-identified patent and that said Letters Patent is hereby corrected as shown below:

In the Claims

Claim 11, Column 16, at the end of Line 53, the word -- callsite -- should be inserted after the word "same".

Signed and Sealed this
Fifteenth Day of September, 2020

Andrei Iancu
*Director of the United States Patent and Trademark Office*